(12) United States Patent
Mauger et al.

(10) Patent No.: US 6,442,147 B1
(45) Date of Patent: Aug. 27, 2002

(54) CONNECTIONLESS COMMUNICATIONS NETWORK

(75) Inventors: Roy Harold Mauger, Radlett; Simon Daniel Brueckheimer, London, both of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/380,174

(22) PCT Filed: Apr. 17, 1998

(86) PCT No.: PCT/GB98/01128
§ 371 (c)(1),
(2), (4) Date: Aug. 26, 1999

(87) PCT Pub. No.: WO98/48591
PCT Pub. Date: Oct. 29, 1998

(30) Foreign Application Priority Data

Apr. 18, 1997 (GB) .............................................. 9707832
Aug. 1, 1997 (GB) .............................................. 9716333

(51) Int. Cl.[7] .............................................. H04L 12/56
(52) U.S. Cl. .............. 370/321; 370/395.43; 370/395.21
(58) Field of Search ................................. 370/254, 255, 370/474, 439, 316, 476, 395.43, 395.21; 455/428, 422, 427, 431

(56) References Cited

U.S. PATENT DOCUMENTS 5,652,751 A * 7/1997 Sharony ..................... 370/227
5,732,086 A * 3/1998 Liang et al. ................. 370/410
5,826,169 A * 10/1998 Natarajan .................. 455/13.1
6,137,798 A * 10/2000 Nishihara et al. ........... 370/392
6,178,169 B1 * 1/2001 Hodgkison et al. ......... 370/395
6,310,893 B1 * 10/2001 Yuan et al. ................. 370/474

FOREIGN PATENT DOCUMENTS

EP 0 748 142 12/1996
EP 0772322 A2 * 5/1997

OTHER PUBLICATIONS

Mauger, "QoS Guarantees for Multimedia Services on a TDMA–Based Satellite Network", IEEE Communications Magazine, vol. 35, No. 7, Jul. 1997, pp. 56–58, 63.
Werner, "ATM–Based Routing in LEO/MEO Satellite Networks with Intersatellite Links", IEEE Journal on Selected Communications, vol. 15, No. 1, Jan. 1997, pp. 69–82.
Mankarious, "A Full Mesh Asynchronous Transfer Mode (ATM) Satellite Communications Network", Proceedings of MILCOM, vol. 1, Nov. 6, 1995, pp. 11–15.
Tasaka, "Links–Level Connection Control Schemes a High–Speed in a High–Speed Satellite Data Network: A Performance Comparison", IEEE Journal Communications, vol. 10, No. 2, 02/01/1992, pp. 437–466.

* cited by examiner

Primary Examiner—Douglas Olms
Assistant Examiner—Ken Vanderpuye
(74) Attorney, Agent, or Firm—Lee, Mann, Smith, McWilliams, Sweeney & Ohlson

(57) ABSTRACT

A non-geostationary satellite network incorporates a plurality of satellite nodes and ground stations in communication with the nodes. Routing and control are established from a virtual model of the network. Within the virtual model, a capacity of space segment band width for different traffic QoS classes can be determined. The relationship between the virtual model and the real network is used to transfer the capacity determination to the real network.

6 Claims, 10 Drawing Sheets

US 6,442,147 B1

CONNECTIONLESS COMMUNICATIONS NETWORK

This invention relates to a connectionless communication network and in particular to an arrangement and method for providing communication in a network structure comprising a ground network and satellite links.

BACKGROUND OF THE INVENTION

Satellite communications systems employing geostationary satellites carrying traffic between ground stations are well established. Although such systems are effective in operation, they suffer from two limitations. Firstly, a geostationary satellite occupies an equatorial orbit and thus its 'footprint' may not extend to higher latitudes. Secondly, a large number of geostationary satellites have already been installed and there are now very few orbital positions available for new satellites. To address these problems, there are recent proposals to provide satellite systems in which non-geostationary satellite nodes co-operate with a ground-based network to form a global communications system.

A method of providing communications in a system employing non-geostationary satellites is described in specification No U.S. Pat. No. 5,621,415. In that arrangement, the satellite footprints are partitioned into linear spanning cells containing multiple linear segments to reduce the hand-off overhead.

A method of operating an ATM network by using a software representation comprising a virtual network model is described in specification No. EP-A-748142. A description of ATM-based routing in LEO/MEO satellite networks is given by M Werner et al. in IEEE Journal on Selected areas in Communications, Vol. 15, No. 1, January 1997, pages 69–82.

Our co-pending United Kingdom patent application No 9707832.3 (Rosenberg 1) relates to a connectionless communications network for transporting broad band services requiring quality of service (QoS) guarantees and for ensuring that the service maintains the quality of service determined at the start of a communication session throughout the duration of that session. In that application, moving satellite nodes are accommodated by maintaining a virtual model of the network having fixed virtual nodes to control packet routing. Routing of packets is performed with reference to the virtual network. By ensuring that topology changes re-establish the bandwidth available within the virtual model, the system provides a guaranteed quality of service. The present invention relates to the protocols for such a network and discloses a method that allows B-ISDN signalling to be used.

Connectionless network operation has been traditionally used in data communications. Its main features are that there is no requirement for a connection set-up phase and that each packet of a connection is routed independently. No connection related state is then needed in the switch and a topological change in a node (i.e., its failure or its hand-over) only necessitates the update of the routing tables contained in its neighbours. For example, networks based on the Internet Protocol (IP) are typically connectionless. Wireless and satellite data networks are often designed for connectionless operation in order to avoid the need for explicit connection hand-overs due to the physical mobility of users or systems. Hence, in a satellite network, connectionless operation removes the need for connection related states to be held in the sky segment. Each packet of information is self-routed so the network is able to adapt to changes due to hand-overs between satellites. Each hand-over can be interpreted as a change of topology.

Transport of broad band services requiring quality of service (QoS) guarantees (i.e., multimedia services) over connectionless network, such as the Internet, is a major issue since traditionally this kind of network has only offered best-effort services. QoS guarantees are usually provided through connection orientation, as in the case of BISDN networks based on ATM. For such networks, a virtual circuit is established during a set-up phase and then routing of individual packets is simplified (i.e., no decision needs to be made) since the route (i.e., the virtual circuit) has already been chosen. In that case, the trade-off between connection orientation and connectionless operation is: the need for a call set-up phase; much less processing per packet; the necessity to keep connection related state in the switches involved in the connection; easier handling of QoS guarantees; no need for end to end re-sequencing; and the need to perform a new connection set-up phase for any topological change involving a node in the route. This last feature is crucial for a LEO based satellite network where topological changes are very frequent.

SUMMARY OF THE INVENTION

An object of the present invention is to provide a connectionless digital communication network having changeable topology and means for maintaining the bandwidth available when the topology changes.

According to one aspect of the invention there is provided a method of operating a non-geostationary satellite network incorporating a plurality of satellite nodes and ground stations in communication with said nodes, the method comprising providing a virtual model of the network, and determining within said virtual model a capacity of space segment band width for different traffic QoS classes, and determining the relationship between the virtual model and the network so as to transfer the capacity determination to the network.

QoS guarantees can be achieved without requiring a connection oriented function within the network so that the network endpoints remain insensitive to topological change within the network.

In a preferred embodiment, a fixed virtual model of the network is maintained and in a physical nodes advertises to adjacent physical nodes with which it has direct links, which virtual node it embodies.

The network preferably includes topology groups of virtual nodes, being fully interconnected within the topology group within the model. Services are preferably ATM based.

In one implementation, the network nodes include satellites with onboard switching functions.

In another implementation the network is ground based.

A connection control system preferably directs connectionless packets to follow paths selected from a virtual model of the network.

In one preferred alternative, a user network interface is part of the Plesiochronous Digital Hierarchy (PDH). In another alternative, a user network interface is part of the Synchronous Digital Hierarchy (SDH or SONET). In yet another alternative, a user network interface is based on the Asynchronous Transmission Mode.

The invention extends to a connection control system for a connectionless communication network, said control system acting to direct connectionless packets to follow paths selected from a virtual model of the network.

The invention further provides a method for transporting broad band services requiring Quality of Service (QoS) guarantees on a connectionless network and ensuring that the service maintains the Quality of Service determined at the start of a communication session throughout the duration of that session.

The invention further provides a call admission control (CAC) policy that ensures a grade of service in admitting calls and in the maintenance of calls.

In a preferred embodiment of the invention, the physical network consists of moving nodes. A virtual model of the network, consisting of fixed Virtual Nodes, is maintained in a connection control system. This model is used to control the route that packets will take through the network. As topology changes happen in the network then the Virtual Nodes of the model become embodied by different real nodes and communicate their virtual identity to connected nodes. Routing of the packets is performed with reference to the virtual network so that packet routing follows the current embodiment of the virtual network. By ensuring that the topology changes re-establish the bandwidth available within the virtual model then the system guarantees that the quality of service established for the session is maintained.

BRIEF DESCRIPTION OF THE DRAWINGS

A preferred embodiment of the invention will now be described by way of example with reference to the accompanying drawings, in which:

FIG. 4 illustrates the Relay/Router nodal functionality for nodes in the satellite application of the network;

DESCRIPTION OF PREFERRED EMBODIMENT

Figure 1:
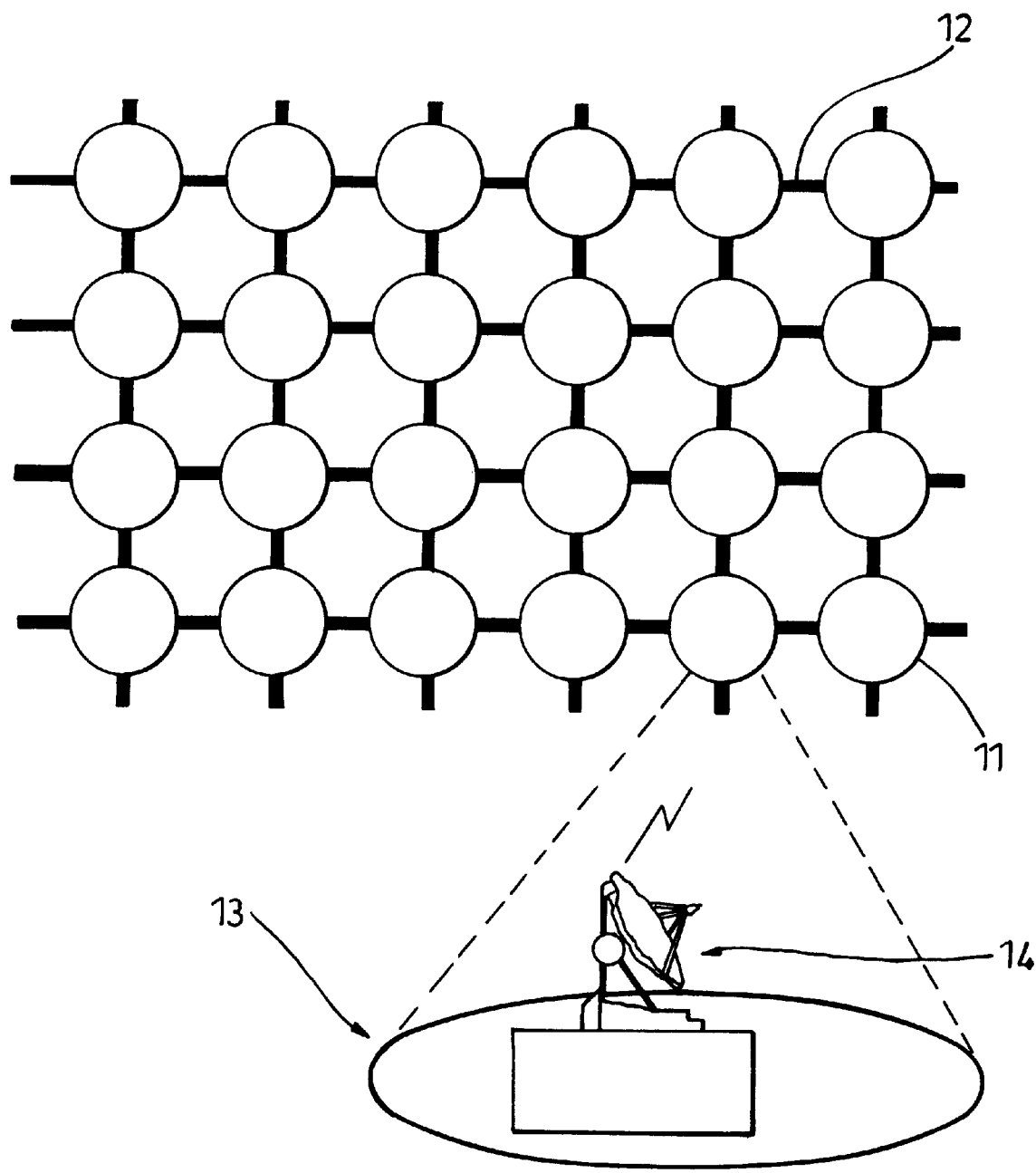
FIG. 1 is a schematic diagram of a satellite network according to a preferred embodiment of the invention.

Referring first to FIG. 1, the network comprises an array of non-geostationary satellites 11 interconnected by inter-satellite communications links 12 between adjacent satellites. These inter-satellite links will typically comprise microwave links carrying a number of communication channels. Typically, the satellites will be low earth orbit (LEO) satellites. The ground portion of the network is partitioned into a number of cells 13 each corresponding to the footprint of a satellite and each containing one or more ground stations 14. The satellites 11 communicate with the ground stations 14, typically via microwave links, and provide the nodes of a communications network in which communications traffic is routed from ground station to ground station via one or more satellites which thus form the nodes of the network. Operation of the system is controlled via one or more network controllers 16.

Figure 2:
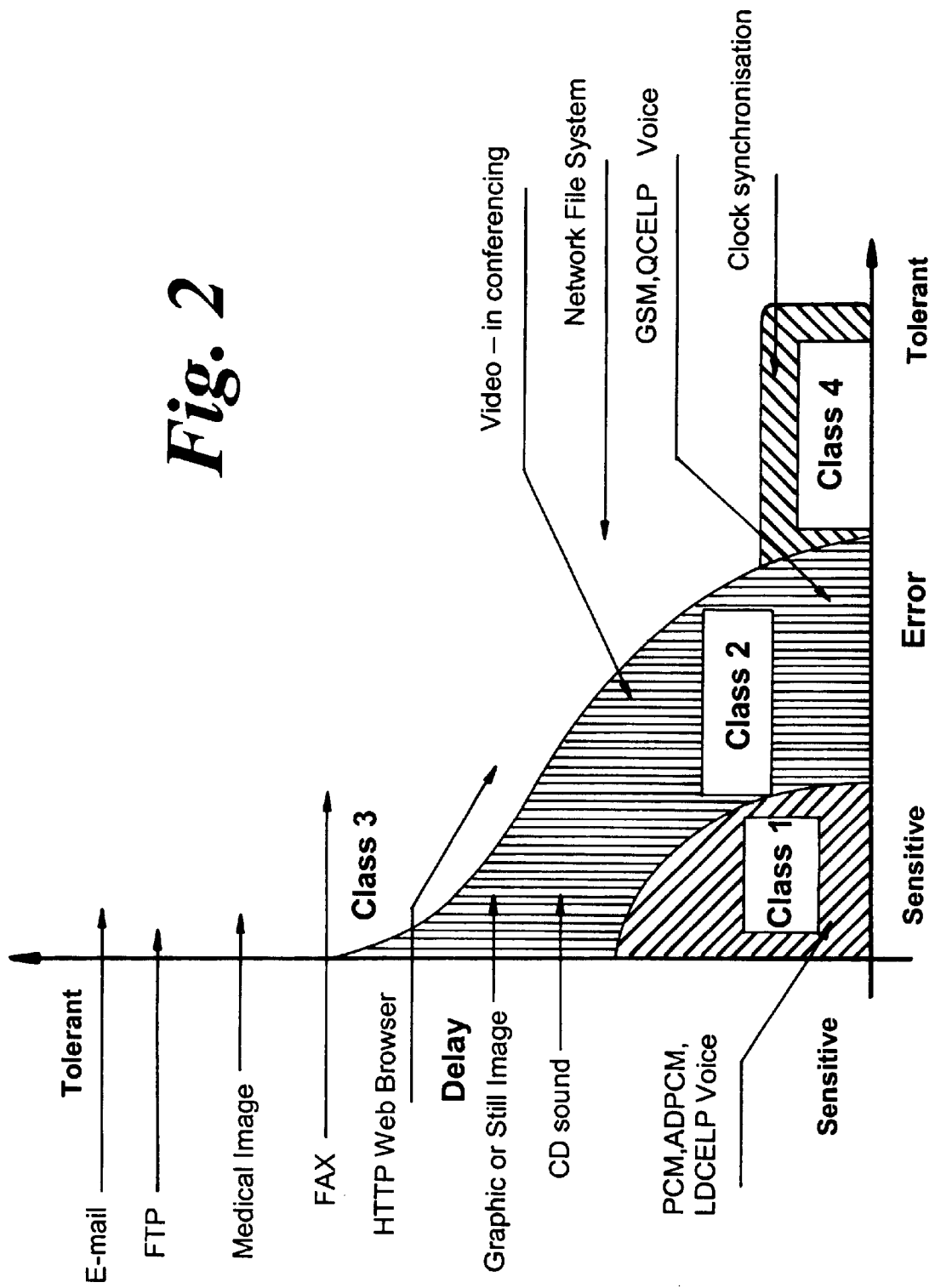
FIG. 2 illustrates typical traffic classes showing their respective error and delay tolerances.

It will be appreciated that although FIG. 1 depicts a regular array of satellites, this, in the case of non-geostationary satellite systems, is a highly idealised 'snap-shot' view of the system as the satellites will be constantly in motion relative to the ground and to each other so that the network topology will be constantly changing. However, the satellite orbits and the corresponding topology changes are predictable in the short and medium term. In general, the prediction of the satellite motion and positions will be determined from a reference model which is updated from time to time from measurements of the satellite positions. Routing of traffic within this topologically changing network is determined by the use of a ground-based modelled or virtual network as will be described below. The network can carry various types of traffic as illustrated in FIG. 2.

Figure 3:
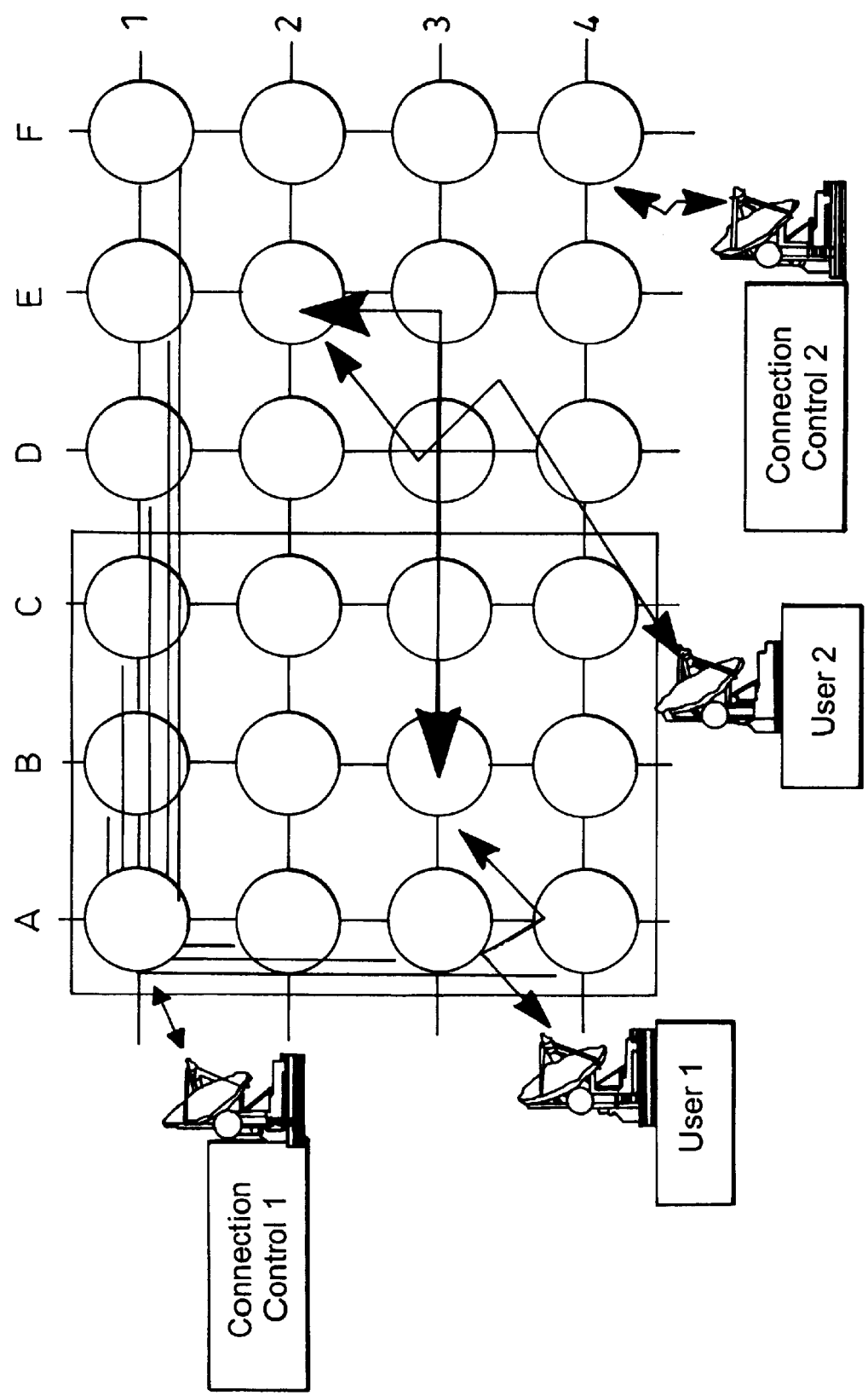
FIG. 3 illustrates the principle of a virtual model as applied to the satellite network of FIG. 1.

Referring now to FIG. 3, this illustrates a ground-based virtual model of the satellite network of FIG. 1 which is constructed for use in determining packet routing in that network. This virtual model is an abstraction of the real network taking into account the operation of the real network.

In principle the routing of connectionless packets is focused along paths with known capacity between users so that the service between the users achieves an agreed quality. This is achieved by selecting paths according to the virtual model of the network whilst allowing nodes of the network to dynamically embody their virtual model node in order to continue to support the traffic stream. If the real nodes provide the same bandwidth as used in the model then the QoS is guaranteed to the end user. FIG. 3 illustrates the virtual model of the network for a satellite application of the system. The physical network consists of moving satellites, each having a footprint corresponding at a given time to many cells. Each satellite is at least connected to its immediate neighbours in the four directions. All the satellites are substantially identical yielding a super symmetrical network in the sky. We create a virtual model of the network, consisting of fixed virtual nodes (VN) 11, and maintained in a connection control system. Each VN is embodied at a given time by a satellite. This model is used to control the route that packets will take through the network. As topology changes happen in the network, i.e. as the satellites move relative to the ground network, then the virtual nodes of the model become embodied by different satellites which communicate their new virtual identity to their connected satellites. Routing of the packets in the real network is then performed with reference to the virtual model.

Figure 4:
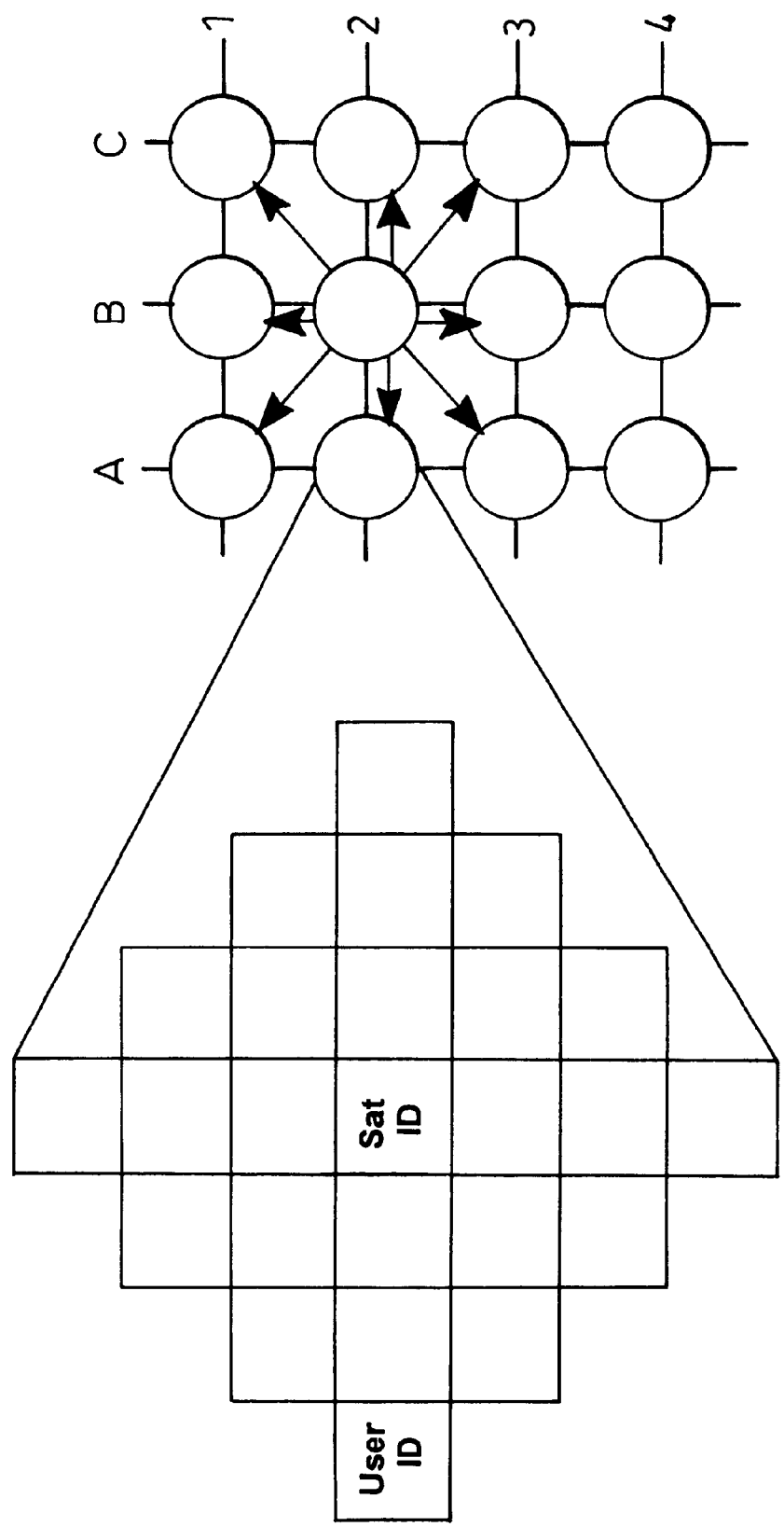
FIG. 4 illustrates the relationship between the virtual model of FIG. 3 and the real network of FIG. 1.
Figure 5:
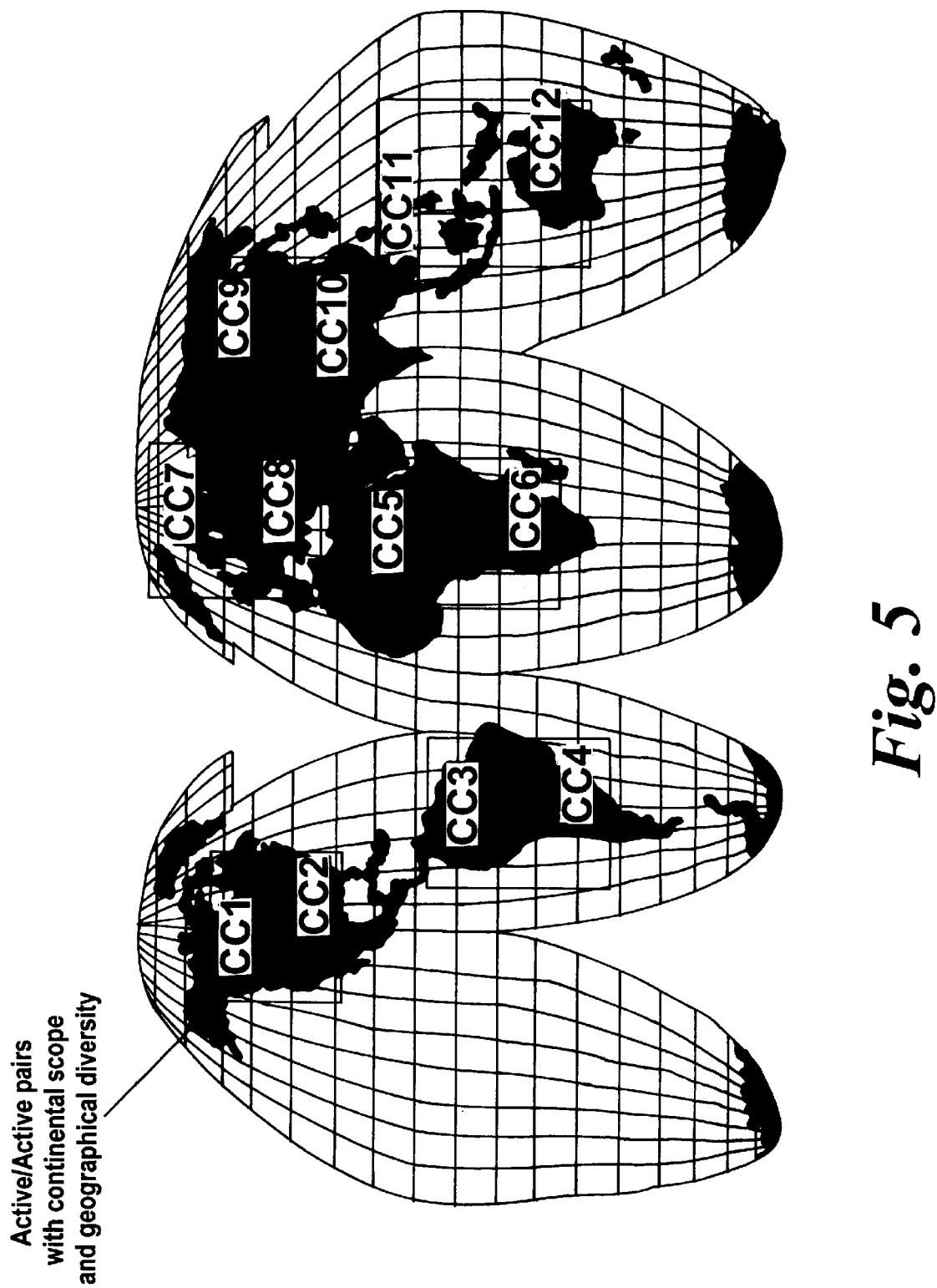
FIG. 5 illustrates a typical satellite geographic coverage.

As shown in FIG. 4, the ground-based model provides a fixed mapping between a set of cells and a modelled virtual node. Hand-over of cells means that modelled nodes may be distributed over up to nine satellites. Ownership of a particular cell 41 identifies a satellite node as embodying the ground-based model of that virtual node. Ownership of cells is broadcast to all adjacent nodes so that the location is visible from the satellite embodying the ground image.

Connectionless packets are routed along paths with known capacity between users so that the service between the users achieves an agreed quality. This is achieved by selecting paths according to the virtual model whilst allowing satellites to dynamically embody their virtual model node in order to continue to support the traffic stream. If the real nodes provide the same bandwidth as used in the model then the QoS is guaranteed to the end user. Users are ground stations 12 (FIG. 3) which are mapped onto virtual nodes (VN) of the network. Each Virtual Node has direct links 33 to a number of adjacent virtual nodes. Further, each virtual node is connected to a certain number of non-adjacent virtual nodes via corresponding virtual connections 34. These virtual connections are ATM-like in their behaviour and may be embodied by ATM (asynchronous transfer mode) or by other means. The purpose of the virtual connections is to reduce or simplify the topology of the network so that a connectionless relationship between two end points can be achieved by routing through a limited number of nodes. The architecture ensures that when the embodiment of VCOs are handed over to the real network, the bandwidth available remains the same as that of the virtual model. Thus the system guarantees that the quality of service established for the session is maintained.

Connections between virtual nodes are made according to a restricted set of routing plans. The example shown in FIG. 3 is that of a "dogleg" connection between virtual nodes. In order to support these routing plans, the mesh of virtual connections links all the satellites according to a defined topology. For a network with a small number of satellites a full mesh would be provided. For a network with a larger number as illustrated here, the mesh could include all satellites within the same constellation and in addition a further mesh of virtual connections linking all satellites which form a line of.latitude around the world. These routing plans appear in the model as modelled virtual paths of defined capacity. Each virtual node is connected to every other virtual node by means of a set of these modelled virtual paths. The capacity of the set of modelled virtual paths linking a pair of virtual nodes is determined by traffic analysis of the community of interest between the nodes and is subject to regular re-engineering as the networks evolve. Each user 12 has a signalling link to its allocated connection control 15 which models the part of the network within which the user resides. Connection controls are fully interconnected with semi-permanent signalling links. A connection request is allocated capacity on a modelled virtual path which, as it is ATM-like in its behaviour, allows the use of standard B-ISDN signalling between the connection control entities. Connection control entities are provided at a small number of physical locations and control connections using an object model of all allocable resources within their section of the network.

Figure 8:
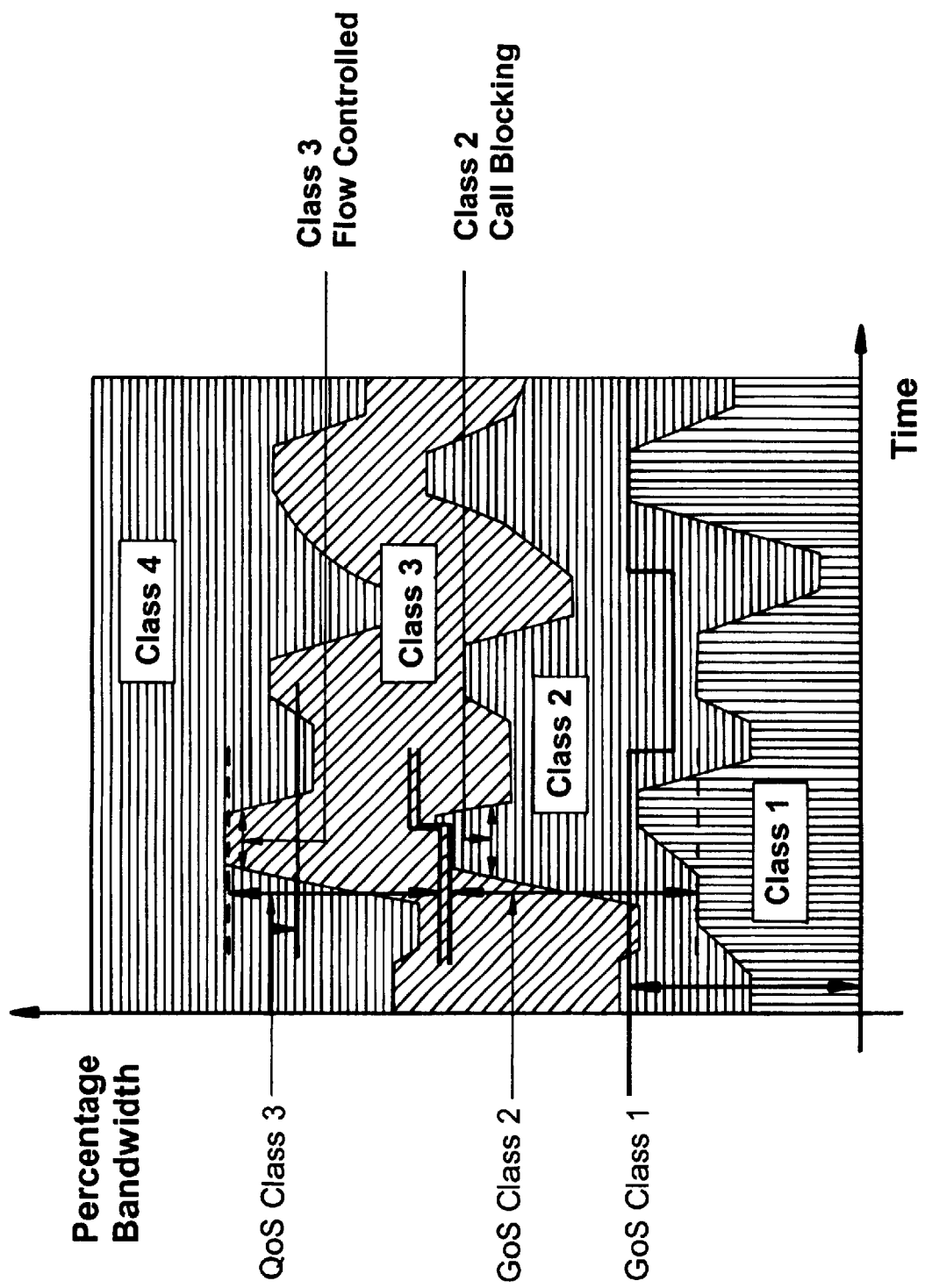
FIG. 8 illustrates the bandwidth demands of the various traffic classes of FIG. 2.

By way of example to illustrate the operation of the network we consider two QoS classes (illustrated in FIGS. 2 and 8) based on the ITU-T and ATM Forum definitions, although the means is not restricted in anyway to this number or their definitions.

QoS class 1 is a stringent traffic class, because there are guarantees for delay, jitter and loss. Examples are PCM voice, compressed voice codecs developed for wire-line applications in which the error incidence has been assumed to be low, and video codecs that have high compression ratios. This is shown in FIG. 2. All these services are call-based inasmuch that they demand immediate human consumption, and hence a low delay of less than the ITU-T figure of 150 ms for voice. Moreover a stable route must be maintained; many of the services that use this model are phase sensitive; any change in the established end-to-end delay will disrupt the communication and relative synchronisation.

QoS class 2 is a tolerant traffic class, because there is not necessarily a stringent requirement on delay, jitter or error, but it is generally expected that these properties can be negotiated for the particular service at connection set-up. Services using class 2 may tolerate higher delay and/or error incidence than the stringent class 1, because of a need for looser bit-rate specification which may vary within bounds. Services at the delay sensitive end of the class 2 spectrum are error-tolerant voice codecs that can mitigate higher error ratios than would normally be expected in wire-line applications such as GSM. Services at the error-sensitive end of the spectrum are for example data-based as part of interactive conferences such as still graphics, slides, document paging and pointing. These services involve human interaction, so they are call-based. A stable route must be maintained since, although not predominantly phase sensitive, the services jitter allowance may be small at the delay-sensitive end of the spectrum, and traffic shaping mechanisms may be used at receive buffers.

It will be understood that further QoS classes may be defined each with its own characteristics.

To satisfy the requirement for reservation of bandwidth and to ensure a stable route, QoS class 1 and 2 traffic must be connection-orientated. The modelled virtual path forms a basis on which those skilled in the art will appreciate that the call admission control policies of the B-ISDN ATM model may be to the admission of calls to the network of QoS class 1 and 2 defined herein. To ensure capacity is not oversubscribed, call admission control (CAC), provides a means of bandwidth accounting which is performed at connection set-up. The modelled virtual paths furthermore ensure that all traffic is routed in the same way in the virtual model such that only limited path-length change artefacts need be compensated, for example satellite hand-off. We have found that, by assigning a higher traffic queue scheduling priority to class 1 services over class 2 services, and restricting these two classes to no alternative path routing during a call by virtue of the modelled virtual path, a connectionless network can satisfy all the criteria of QoS classes 1 and 2.

The CAC and the available capacities of the modelled virtual and physical paths controls the grade of service of the network. A given CAC responds to QoS class 1 and 2, and the selected transfer capability at call request, and determines from the available capacity (and functional boundary conditions) how many new calls can be admitted. The accuracy of the CACs will contribute to the overall GoS and in part the realised QoS. If there is an abundance of Class 1 traffic calls, then the Class 1 and Class 2 CACs will admit fewer calls for a given remaining capacity shared between the classes. Essentially this call-blocking rate will depend at any moment on the utilisation and classes of all the established calls. It is not wrong to reject calls, but this will represent a poor GoS and the network preferably needs more capacity.

Within satellite systems the world or global surface is divided up into cells. A certain number or group of these cells will be served by a particular satellite for the duration that the satellite is overhead and these cells will then be handed over to the subsequent satellite passing over. This may be a satellite in the same orbit or due to the rotation of the earth, it may be necessary to hand over to a satellite in an adjacent orbit. Within a cell, a satellite provides a transport system, typically TDMA, which allows the bandwidth to be shared between the active users located in that cell. In the virtual model, as illustrated in FIG. 4, a fixed number of cells is mapped onto a virtual node (VN) together with the associated users. The actual number of cells depends on the capability of the satellite. When the satellite is at the apogee of a VN then it could embody all the cells of that VN. Cells are handed over between satellites on an individual basis so that there is a discrepancy between the ground model and the real satellite embodiment, in that the cells corresponding to one virtual node may be embodied in up to nine satellites. In order to resolve this, a particular cells is used to identify the virtual node which is embodied by the satellite acquiring that cell. The identity of cells acquired by a satellite and consequently the identity of users, is advertised to adjacent satellites so that routing of packets to the node embodying the virtual node is sufficient to route the packet to the final destination. Bandwidth allocation within the model has to take into account that the sky based implementation will be distributed over nine satellites: a modelled virtual path is an allocation of a fixed amount of bandwidth between two virtual nodes. As a real user may send packets to up to nine satellites, at the source, and deliver packets via up to nine satellites at the destination, there are up to eighty one ($9^2$) possible paths that can be taken between the source and destination. In fact the paths are predictable as they relate to the motions of the fixed satellite orbits with respect to the static virtual model. If the actual sources and sinks of traffic are entered into a geographical database then it is possible to predict for each traffic source and sink, which of the nine satellites in the sky will be used for this traffic element, i.e. which of the eighty one possible paths it will take. As this is a property of the configured network it is possible to perform this calculation in an off-line system so that the modelled virtual path can be checked against all of the physical links it will use. This will ensure that there is no blocking in a worst case relationship between the mobile satellites and the fixed virtual model.

As discussed above, the connection illustrated in FIG. 3 is a "dogleg" or angular path between virtual nodes B3, E3, E2. Three stage routing is used to deliver packets, initially to the topology group including the virtual node, which in this example is a constellation of satellites, then to the satellite embodying the virtual node and then to the current user location. A topology group is defined as a group of fully interconnected virtual nodes within the network model.

The functionality of a node within this system is that of a dual mode relay/router. This is illustrated in FIG. 6. In the relay mode the node is ATM-like. Broadly, the TDMA slot is encapsulated into a connection oriented-like entity (i.e., an ATM-like encapsulation) for forwarding over the virtual connections. In this example, this entity is an AAL-2 mini-channel connection.

Hence in this, the relay mode, the satellite simply relays minicells on virtual connections without inspecting the contents (no processing of address). In this mode, the topology reduction or simplification of the network allows the restriction of the number of routing steps for any connections. The virtual connections will need to be handed over in the case of satellites moving in counter-rotational orbits. So long as the hand-over maintains continuity, this has no impact on the end user.

At the routing nodes (i.e., at the satellites where routing has to be performed as opposed to relaying) the TDMA slots are inspected and the routing labels are used in a four stage process (assuming dogleg routing). Satellites which are embodying virtual nodes advertise their respective virtual node ID on all virtual connections. The first stage of the routing is carried out in the satellite embodying the originating VN, i.e., the one corresponding to user 1 (in the case depicted in FIG. 2 this VN is B3). The second stage is performed in the satellite embodying the VN which is at the intersection of the fully meshed latitude group containing the originating VN and the fully meshed constellation containing the receiving VN. Depending on the 'direction' of the dogleg this may be between the constellation and the latitude group. In the case depicted in FIG. 2, this VN is E3. The third routing stage is carried in the satellite embodying the receiving VN (in the case depicted in FIG. 2, this VN is E2). For the final stage the receiving virtual node identifies the satellite currently owning the user's cell and forwards the TDMA slot to the destination node. As slots are independently routed in the sky, they may arrive at the ground station out of order and thus require re-sequencing. The ID may be determined by advertising information between satellites or by a programmed predictable relationship with the ground.

The relay/router function can be achieved using AAL2 (ATM adaptation layer 2) where the relay function can be implemented by a common part sublayer (CPS) and the router function can be implemented as a service specific convergence sublayer (SSCS).

Figure 7:
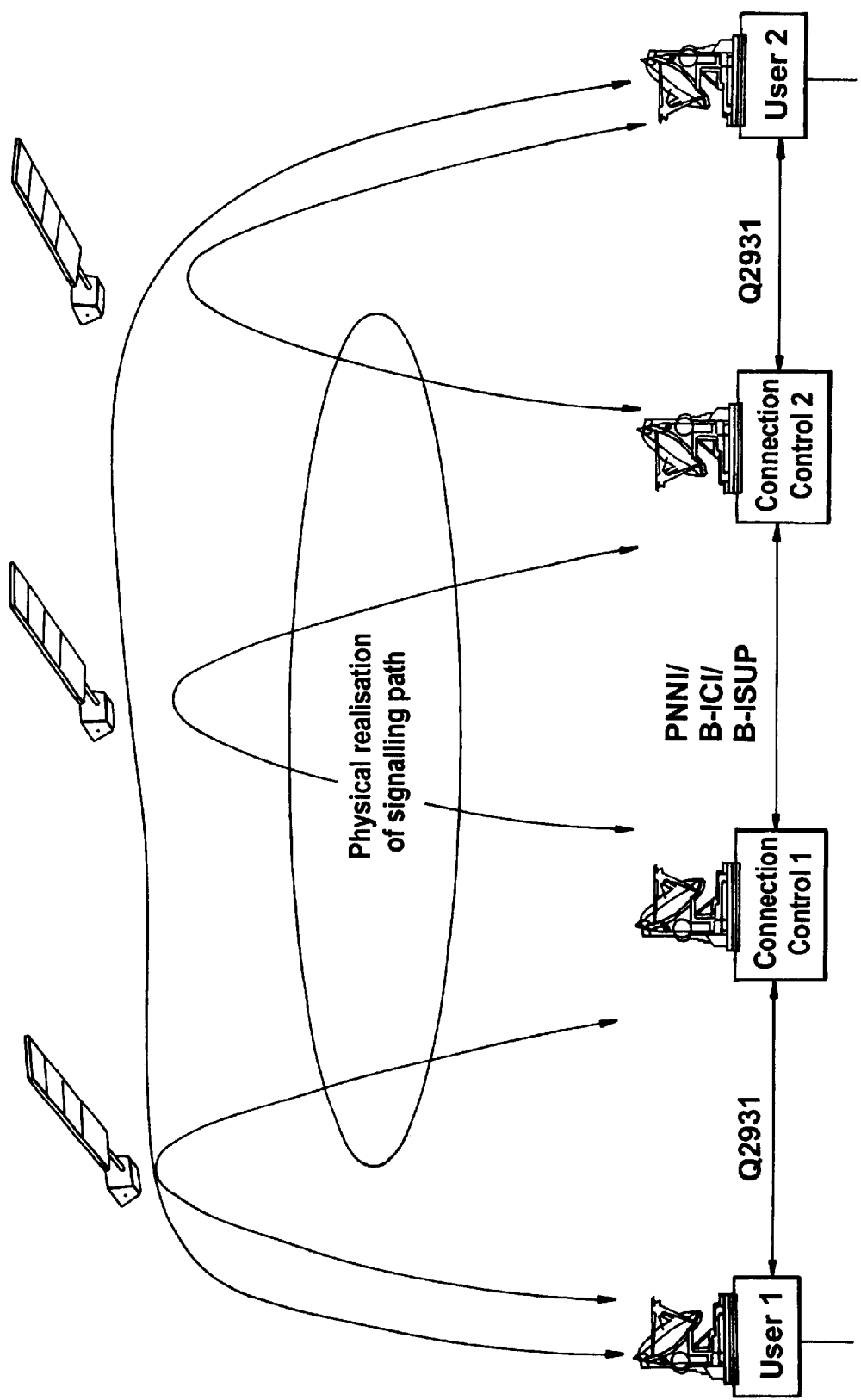
FIG. 7 illustrates deployment of the connection control function of the network of FIG. 1.

Connection control (CC) functions can be centralised on a continental scale. Scaling of computer capacity is not a problem and, if located in low traffic areas, e.g. as illustrated in FIG. 7, then signalling traffic is not a problem either. Such a high degree of centralisation preferably requires geographic security. The model proposed is active/active with both CCs operating concurrently and each capable of handling the workload of the other. With this scale of connection control, it is practical to provide pair-wise interworking between CCs for most connections. Where this is not practical then a CC would grant capacity on transparent virtual connection through its network section so that only two CCs are required in any connection negotiation. The granted capacity can be re-negotiated on a time frame substantially longer than a connection time.

Both connection controls can operate in parallel on the same model check-pointing the connection details to the other CC at the end of the set-up/tear-down process The virtual connections will need to be handed over in the case of satellites moving in counter-rotational orbits. So long as the hand-over maintains continuity, this has no impact on the end user. The routing labels are invariant for the duration of the connection and are also invariant for hand-overs of any user, virtual node or virtual connection between satellites.

Within the exemplary satellite network described herein, the basic requirement to embody a path is to link TDMA slots between an uplink and a down-link. This leads to a TDMA slot as the basic unit of switching in the sky. This TDMA slot includes routing labels as the basis of connectionless routing. The first routing label (E) corresponds to the constellation; the second (E2) to the virtual node (VN) within this constellation, which is the receiving VN; and the third(User ID), is the user identity. At least two other routing labels are provided, one (Seq No) giving the sequence number of the PDU for re-sequencing purpose and a further one (STR) to indicate the routing strategy that has been chosen.

The routing labels are invariant for the duration of the connection and are also invariant for hand-overs of any user, virtual node or virtual connection between satellites.

Figure 10:
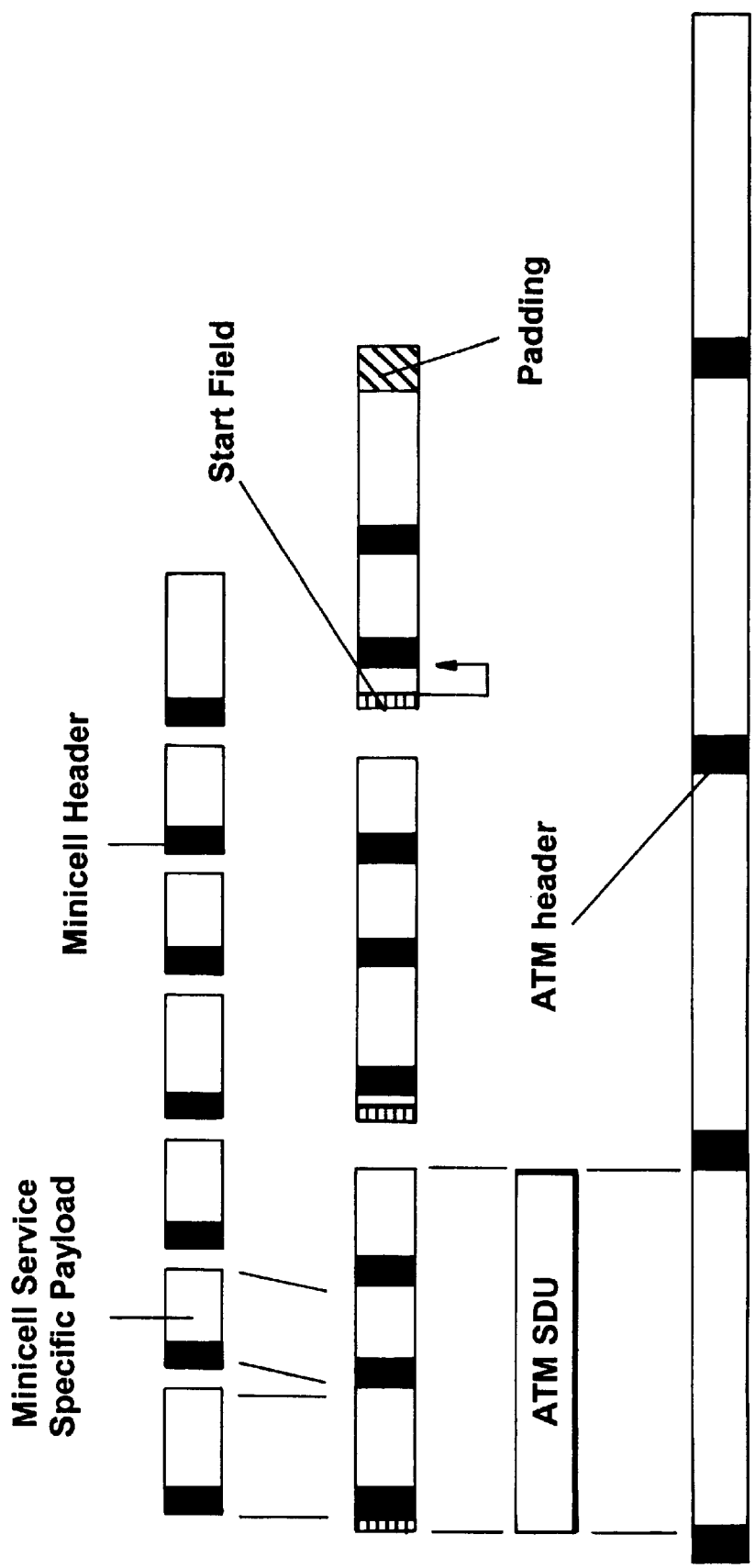
FIG. 10 illustrates an ATM minicell protocol for carrying traffic in the network of FIG. 1.

The AAL-2 adaptation layer has been optimised to cope with the demands of low bit-rate communications, representing the increasing trend to greater voice compression. The adaptation layer is a multiplex of users in a single ATM connection, where each user's information is carried in a short packet or minicell, with a header identifying the user channel with ancillary control information. The minicell format is illustrated in FIG. 10. By sharing the fixed length payload of the ATM cell between users, the compromise of trading cell assembly delay for bandwidth efficiency is avoided, a sacrifice which would be acute at low bit-rates and on expensive leased lines. AAL-2 adaptation equipment performs a concentration function to ensure high utilisation, but can also limit the holdover delay of traffic when usage is low.

A further feature of minicells is that they may be of variable size, from 1 to 64 octets, to accommodate a wide variety of applications with minimal overhead. Thus the mapping to ATM cells is asynchronous and in fact independent of the length of an ATM cell. The boundary of minicells in the ATM cell payload is signified in every cell by a start field (STF), which specifies the offset, and thus the minicells form a self-delineating flow.

We have found that the AAL-2 protocol format can be employed to carry minicells transparently over access systems which have fixed frame formats other than ATM cells, such as MPEG-2 transport stream. In fact minicells do not require an ATM cell or other frame structure at all, as it is possible to map the start field octet once every 48 octets with minicells in the intervening octet positions directly onto any physical bearer. The bearer identity can be used to regenerate the implicit ATM cell headers where the VCC needs to be transported over conventional ATM transmission.

In the present exemplary embodiment, ATM cells or other minicell bearer systems are carried over a physical link into the AAL-2 system. The AAL-2 system is in two parts a common part sublayer (CPS) and a service specific convergence sublayer (SSCS), the CPS has a multiplexer and a demultiplexer function which packs and unpacks minicells from ATM cells. The unpacked minicells are placed in a dynamic buffer. Input and output schedulers drive the process of packing and unpacking minicells between the dynamic buffer and the various minicell sources and sinks. Minicells can be switched from one AAL-2 VC to another AAL-2 VC via a CPS relay function. This provides an AAL-2 switching layer which is analogous in many ways to a normal ATM switch. Alternatively the minicells can be passed to an SSCS level in order to adapt the format to that used at the service access point (SAP). A number of standard SSCS functions are defined including the null and segmentation and re-assembly (SAR). In addition, further SSCS layers may be defined to achieve any additional functionality required by the AAL-2 application.

Figure 6B:
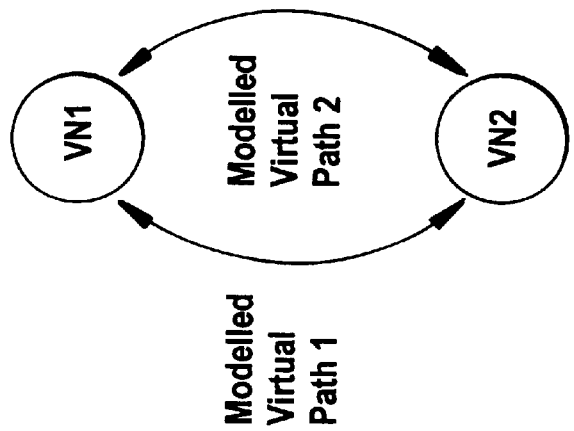
FIG. 6 illustrates the principle of a modelled virtual node
Figure 6A:
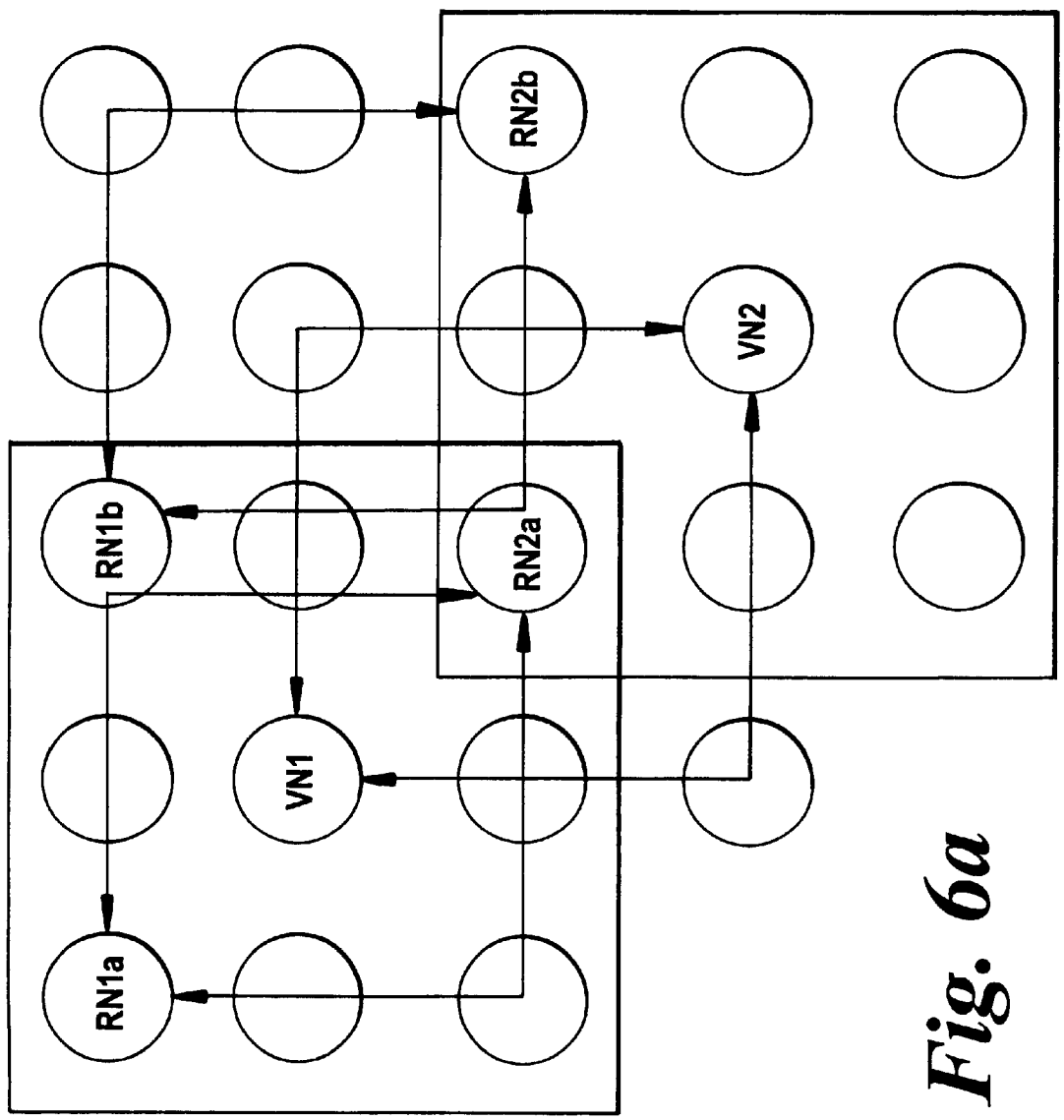

The relay/router comprises four modules operating through a common ATM backplane. The uplink module terminates the uplink TDMA system and maps TDMA connections as AAL-2 VC's and TDMA slots as AAL-2 minicells. These VCs are passed to an AAL-2 switch module where the mini-channel connections can be switched from one AAL-2 VC to another. If, for a particular Virtual Connection, the node is configured to operate as a router function, then the initial AAL-2 VC is associated with the uplink module and the second AAL-2 VC is associated with the router SSCS function. The router SSCS layer provides the routing label format, and the router layer provides the functions described above associated with FIG. 3. The minicells on the inter-satellite link are carried directly on the physical layer. This is achieved by a header suppression function which adds and removes headers between the external world where they are not required, as there is only one AAL-2 VC per satellite link, and the internal world where they are used to provide scalability of the node. In this way the actual switched entities across the satellite network are TDMA slots encapsulated as AAL-2 minicells. Connection control (CC) functions can be centralised on a continental scale. Scaling of computer capacity is not a problem and, if located in low traffic areas, then signalling traffic is not a problem either. Such a high degree of centralisation preferably requires geographic security The principle of the modelled virtual node is illustrated in FIG. 6a and 6b. Two Virtual Nodes are illustrated VN1 and VN2. The two virtual nodes are connected by two "dogleg" routing plans which embody modelled virtual paths.

The two virtual nodes are surrounded by a representation of the real network. A user cell in each virtual node may in reality be served by any one of nine real nodes. Two example embodiments of the modelled virtual paths are shown wherein the users are served by RN1a/RN2a and RN1b/RN2b leading to different physical resources being utilised. There are thus up to eighty one ($9^2$) different embodiments of the modelled virtual paths in the real network. However the embodiments are predictable and are based on long term communities of interest between large traffic sources and sinks. This predictability is due to real users being fixed on the ground and the satellites moving in fixed known orbits. The large traffic sources and sinks are the virtual Nodes themselves. It is therefore possible to follow current practice of measuring traffic communities of interest and deploying capacity to meet demand at a given grade of service. The configured capacity can then be computed with reference to a geographical database of real user locations so that the capacity demand on real physical resources can be computed for each of the modelled virtual paths. This ensures that there is sufficient capacity for the worst case relationship between the modelled environment and the real physical network. The end result of the modelling activity is a network of fixed virtual nodes connected by modelled virtual paths of known capacity. This is an environment which is an exact virtual image of a broad band-ISDN network which enables B-ISDN signalling and CAC policy to be used in the operation of the connection control entities. The signalling environment is illustrated in FIG. 10 which illustrates the implementation of signalling and connection control in the network. All of the signalling paths are via the satellite as a general rule. The logical signalling paths are between users and connection control entities. Signalling sequences result in a user path being established via the satellite network between two user equipments. Each user 60 has a signalling link 62 to an allocated connection control (CC) 63 which models the part of the network within which that user resides. Connection control nodes are fully interconnected with semi-permanent signalling links 64, and a connection request is allocated capacity on a modelled virtual path which, as it is ATM like in its behaviour, allows the use of standard B-ISDN signalling between the connection control entities, this being illustrated in FIG. 9. Connection control entities are provided at a small number of physical locations and control connections using an object model of all allocable resources within their section of the network. Connection control functions can be centralised on a continental scale, for which scaling of computer capacity is not a problem by the use of object models. Furthermore if connection control entities are located in low demand traffic areas, then signalling traffic congestion is avoided.

Figure 9:
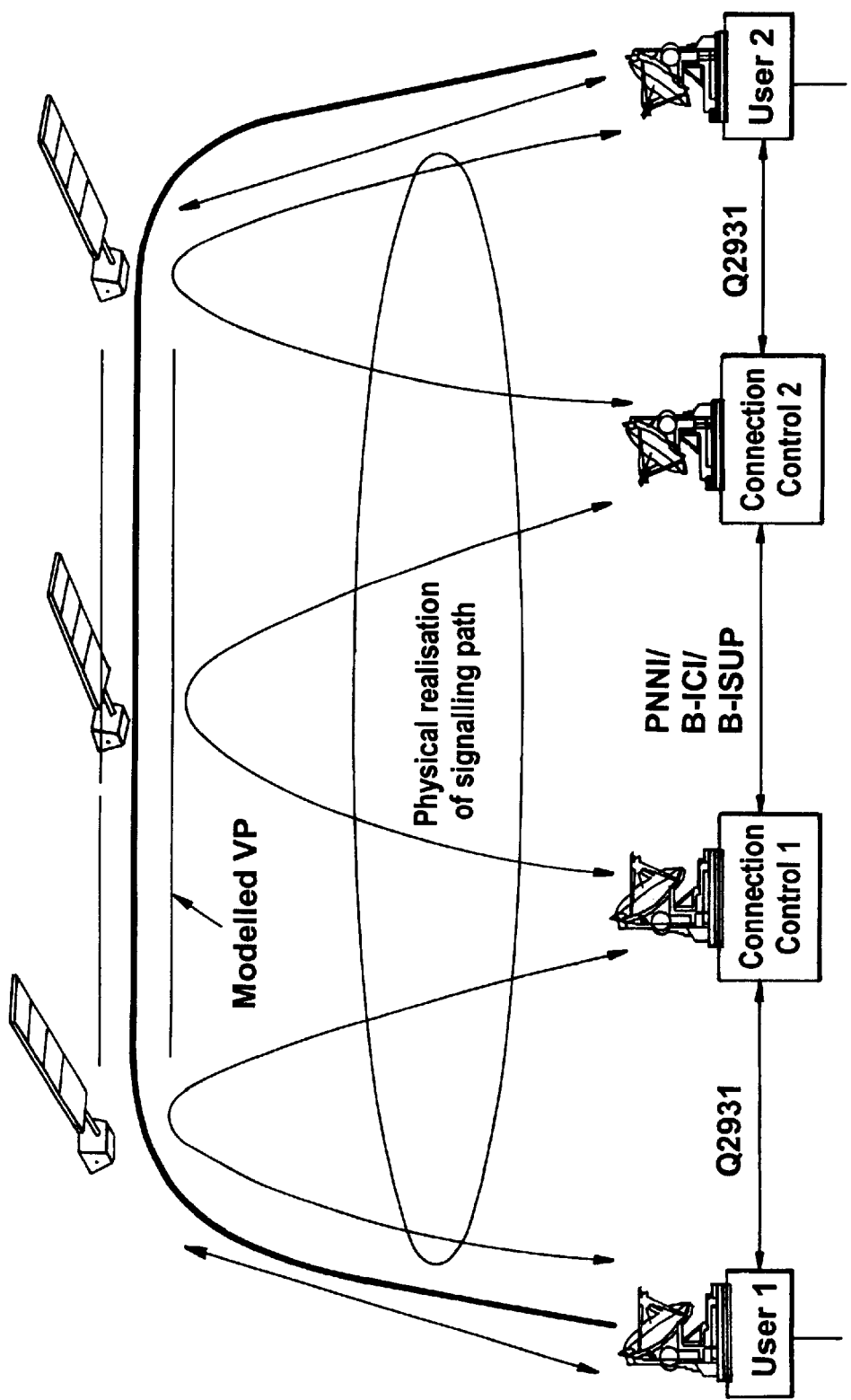
FIG. 9 illustrates the principle of the modelled virtual path.

A possible scoping or deployment of the connection control function (CC) is illustrated in FIG. 9. Most connections can be made with a pair-wise communication between two connection controls. Exceptionally, a third connection control can grant through capacity as a transit virtual connection.

The B-ISDN signalling systems comprise a family which can include DSS2(Q2931), PNNI, B-ICI and B-ISUP. These represent current ITU and ATM Forum practice.

It will be understood that the above description of a preferred embodiment is given by way of example only and that various modifications may be made by those skilled in the art without departing from the spirit and scope of the invention.

We claim:

1. A method of determining routing information for calls of different quality of service (QoS) classes, each class having a respective bandwidth requirement, between pairs of end points in a telecommunications packet network having a constantly changing topology and comprising a plurality of non-geostationary satellite nodes being interconnected by inter-satellite communications links established between temporarily adjacent satellites, and ground stations each in communication with the respective satellite node currently nearest to that ground station, the method comprising: providing a static virtual model of the network, said model comprising an array of fixed virtual nodes wherein each virtual node corresponds to a respective satellite node and wherein direct links are established between adjacent virtual nodes and virtual connections are established between non-adjacent virtual nodes whereby to reduce the topological complexity of the network, periodically determining the relationship between the virtual model and the current satellite network topology so as to update said virtual model with that current topology, and determining within said virtual model routes for said calls and a capacity of space segment bandwidth for the different traffic QoS classes, and transferring the routes and capacity determinations from the modelled virtual network to the real network so as to route the calls through the real network.

2. A method as claimed in claim 1, wherein ground-based traffic employs a TDMA format, and wherein TDMA time slots comprise the units of switching between said satellite nodes.

3. A method as claimed in claim 2, wherein connectionless routing within the satellite network is determined from routing labels.

4. A method as claimed in claim 3, wherein each real satellite network node advertises to adjacent real satellite nodes the identity of the modelled virtual node corresponding to that real node.

5. A method as claimed in claim 4, wherein end to end bandwidth is determined for different traffic QoS classes.

6. A method as claimed in claim 5, wherein call admission to the network is controlled so as to maintain quality of service for each said traffic QoS class.

* * * * *